UNITED STATES PATENT OFFICE 2,148,945

PLUG

Meijlom Hoedemaker, Heemstede, Netherlands

No Drawing. Application November 2, 1937, Serial No. 172,495. In the Netherlands November 9, 1936

4 Claims. (Cl. 72—105)

The invention relates to a plug constituting a fastening member in stone, metal and similar hard material. Although such plugs have already been proposed it still appears that certain drawbacks are present. The most important drawbacks connected with wallplugs which have been used up until now, consist in the softness of the plug, so that when it is driven into a hole in a wall it is completely deformed; further when driving a screw into the plug which has been fastened in the wall, the plug begins to rotate on account of insufficient friction between the plug and the surface of the hole, causing the plug to break up. Another drawback is that the measures taken for making the plug sufficiently resistant to moisture and acid, greatly increase the costs of manufacture.

The object of the present invention is to avoid the drawbacks mentioned above satisfactorily, without causing new drawbacks.

According to the invention, the plug is manufactured of fibrous material, which is sprayed with a metal either before or after having been formed into a plug. The plug may be made of skeins of fibrous material, which skeins are formed into a plug, and sprayed with a metal, and are then mutually joined together and shut off from the atmosphere at the exterior.

It is clear that by the present invention a plug is obtained, which shows sufficient stiffness to successfully withstand the force exerted thereon when driving the plug into a hole. Further the metal coating on the plug gives sufficient protection against deterioration of the fibrous material. Also when the right metal is chosen it offers the advantage that when driving a nail or a screw into the plug, the metal coating is pressed by the expansion of the plug into the finest pores of the wall of the hole, so that rotation or displacement of the plug is prevented. The conductive property of the plug guarantees that incidentally occurring electric voltages, are led off when a plug is used for securing electric switches.

The inventive idea can be realized in different forms. It is possible to manufacture the plug of a strip of paper, which, before rolling up to form a plug, is metalized by spraying with metal. It is also possible to first roll up the strip of paper into a plug and then metalize same. Further the plugs may also be manufactured of skeins or threads of fibrous material, which are metalized before being formed into a plug by twining or joining or in another manner, or the metalizing may take place after the fibrous material is formed into a plug, in which latter case the metal coating serves simultaneously for keeping the fibrous material together.

I claim:

1. A plug of stranded fibrous material coated externally with finely divided metal.

2. A plug of stranded fibrous material, the strands being coated externally with finely divided metal.

3. A plug consisting of a strip of fibrous material coated externally with finely divided metal.

4. A plug consisting of a strip of fibrous material, the strip being coated externally with finely divided metal.

MEIJLOM HOEDEMAKER.